United States Patent [19]

Boyd et al.

[11] Patent Number: 5,895,487

[45] Date of Patent: Apr. 20, 1999

[54] INTEGRATED PROCESSING AND L2 DRAM CACHE

[75] Inventors: William Todd Boyd, Poughkeepsie; Thomas James Heller, Jr., Rhinebeck; Michael Ignatowski, Red Hook; Richard Edward Matick, Cortlandt Manor; Stanley Everett Schuster, Granite Springs, all of N.Y.

[73] Assignee: International Business Machines Corporation, Armonk, N.Y.

[21] Appl. No.: 08/748,300

[22] Filed: Nov. 13, 1996

[51] Int. Cl.$^6$ .................................................. G06F 12/08
[52] U.S. Cl. ............................................................ 711/122
[58] Field of Search ................................ 711/119, 121, 711/122, 124

[56] References Cited

U.S. PATENT DOCUMENTS

| | | | |
|---|---|---|---|
| 4,797,814 | 1/1989 | Brenza | 711/3 |
| 4,905,188 | 2/1990 | Chuang | 711/128 |
| 5,249,282 | 9/1993 | Segers | 711/122 |
| 5,276,848 | 1/1994 | Gallagher et al. | 711/121 |
| 5,285,323 | 2/1994 | Hetherington et al. | 711/122 |
| 5,287,508 | 2/1994 | Hejna, Jr. et al. | 395/672 |
| 5,386,547 | 1/1995 | Jouppi | 711/122 |
| 5,388,072 | 2/1995 | Matick et al. | 365/230.03 |
| 5,450,563 | 9/1995 | Gregor | 711/3 |
| 5,509,132 | 4/1996 | Matsuda et al. | 711/3 |
| 5,537,573 | 7/1996 | Ware et al. | 711/137 |

OTHER PUBLICATIONS

IBM TDB, "Handling Reservations in Multiple-Level Cache", P441-445, Dec. 1993, vol. 36 No. 12.

Intel, "Pentium Processor User's Manual: vol. 2: 82496 Cache Controller and 82491 Cache SRAM Data Book", 1994, pp. 3–1 to 3–3.

Hundal et al., "Determination of Optimal Sizes for a First and Second Level SRAM-DRAM On-Chip Cache Combination", 1994, pp. 60–64, IEEE.

Iwata et al., "Performance Evaluation of a Microprocessor with On-Chip DRAM and High Bandwidth Internal Bus", May/1996, pp. 269–272, IEEE.

IBM TDB, "Shared L1 Cache", pp. 277–280, Mar. 1993, vol. 36 No. 03.

ECC Distributed Across Cache Line (IBM Technical Disclosure Bulletin), EN890-0447 (G. Gilda) vol. 34 No. 6 Nov. 1991.

*Primary Examiner*—Eddie P. Chan
*Assistant Examiner*—Kevin L. Ellis
*Attorney, Agent, or Firm*—Whitham, Curtis & Whitham; Kevin Jordan, Esq.

[57] ABSTRACT

An integrated processor and level two (L2) dynamic random access memory (DRAM) are fabricated on a single chip. As an extension of this basic structure, the invention also contemplates multiprocessor "node" chips in which multiple processors are integrated on a single chip with L2 cache. By integrating the processor and L2 DRAM cache on a single chip, high on-chip bandwidth, reduced latency and higher performance are achieved. A multiprocessor system can be realized in which a plurality of processors with integrated L2 DRAM cache are connected in a loosely coupled multiprocessor system. Alternatively, the single chip technology can be used to implement a plurality of processors integrated on a single chip with an L2 DRAM cache which may be either private or shared. This approach overcomes a number of issues which limit the performance and cost of a memory hierarchy. When the L2 DRAM cache is placed on the same chip as the processor, the time needed for two chip-to-chip crossings is eliminated. Since these crossings require off-chip drivers and receivers and must be synchronized with the system clock, the time involved is substantial. This means that with the integrated L2 DRAM cache, latency is reduced.

11 Claims, 10 Drawing Sheets

INTEGRATED PROCESSING AND L2 DRAM CACHE

BACKGROUND OF THE INVENTION

Field of the Invention

The present invention generally relates to memory hierarchical structures in microprocessor systems and, more particularly, to an integrated processor and level two (L2) dynamic random access memory (DRAM) on a single chip. As an extension of this basic structure, the invention also contemplates multiprocessor "node" chips in which multiple processors are integrated on a single chip with L2 cache.

Background Description

In nearly every computer memory system, the memory hierarchy plays a major role in determining the actual system performance. One would like unlimited amounts of fast memory as close to the processor as possible to minimize latency during memory accesses. This can be seen by the fact that an upper bound to system performance is often specified assuming infinite cache. Infinite cache assumes unlimited memory and no degradation in speed for the closest level of the memory hierarchy. Although this is useful in giving an upper bound for performance, it is not practically realizable for several reasons. Memory speed degrades with increased capacity, the cost per bit of the first level cache is high, and there are physical limitations due to the large area per bit of the first level of the hierarchy.

The need for very fast memory plus very dense memory in order to achieve the highest system performance has been partially solved by building a memory hierarchy where small amounts of high speed memory is placed close to the processor and denser, slower memory is placed further away. The high speed memory close to the processor is referred to as level one, or L1, cache, and the denser, slower memory is referred to as level two, or L2, cache. Typically, level three, or L3, memory is main memory or random access memory (RAM). Distance from the processor refers to the number of processor cycles it takes to get data to the processor from that level of the memory hierarchy. Obviously, in a memory hierarchy, the closer to the processor that the data resides, the higher the performance. When data is not found in the higher level of the hierarchy and a miss occurs, the data must be accessed from a lower but larger level of memory hierarchy. Since each level of the memory hierarchy contains increased amounts of storage, the probability increases that the data will be found. But equally important for performance is the latency or number of cycles it takes to transfer the first byte of data to the processor plus the time to transfer the remaining bytes of the cache line.

Many current microprocessor systems consist of a processor with an L1 static random access memory (SRAM) cache on the same chip plus a separate off-chip L2 SRAM cache. In some systems, a small L2 SRAM cache has been moved onto the same chip as the processor and L1 cache, in which case the reduced latency is traded for a smaller L2 cache size. In other systems, the size of the L1 cache has been increased by moving it onto a separate chip, thus trading off a larger L1 cache for increased latency and reduced bandwidth that result from the chip-to-chip crossings. These options are an attempt to achieve the highest system performance by optimizing the memory hierarchy. In each case, various tradeoffs between size, latency, and bandwidth are made in an attempt to deal with the conflicting requirements of "more is better" and "closer is better".

With the advent of 256 Megabit (Mb) to 1 Gigabit (Gb) dynamic random access memory (DRAM) chips, semiconductor technology has reached the point where multiple processors and multiple memory hierarchies can be integrated on one chip. If current system architectures and interconnections are maintained and simply "mapped" on a smaller unit of design, the performance improvement will be minimal because the reload time is not being improved at the same rate as the other speed limiting factors. Reload time is becoming increasingly important and any delays can substantially deteriorate performance. This results from the fact that for an L1 cache miss, the cache accesses are typically halted until the miss is restarted. For processors such as used here, the performance in cycles per instruction at infinite cache (perfect memory system) is typically 0.5 to 1 cycle/instruction, and getting smaller. Thus, every additional cycle required for reload can add a significant "finite cache penalty" to the average performance. In order to maintain a certain minimal level of finite cache penalty, the reloading of the memory hierarchy must be improved.

SUMMARY OF THE INVENTION

It is therefore an object of the present invention to fabricate an integrated processor and L2 DRAM cache on a single chip to provide high on-chip bandwidth, reduced latency and higher performance.

It is another object of the invention to provide a multiprocessor system in which a plurality of processors with integrated L2 DRAM cache are connected in a loosely coupled multiprocessor system.

It is a further object of the invention to provide a single chip technology in which a plurality of processors are integrated on a single chip with an L2 DRAM cache.

According to the invention, more memory bits are placed closer to the processor. This is accomplished by replacing the L2 SRAM cache with an L2 cache comprising a DRAM array that is integrated on the same chip as the processor. This approach overcomes a number of issues which limit the performance and cost of a memory hierarchy. First, since for memories designed in the same technology, the capacity of DRAMs is roughly sixteen times that of SRAMs. The use of a DRAM array makes it possible to put more bits on the same chip as the processor. It is clear that a larger L2 cache will decrease the miss ratio to the next level of the hierarchy. What is not obvious is the impact on latency. The prevailing view is that replacing a fast SRAM with a slower DRAM will cause latency to increase. This is the case if both the SRAM and DRAM are on separate chips from the processor. For this case, the delays in going from the processor chip to the L2 cache chip and back to the processor when an L1 cache miss occurs should be same for both cases except for the access times of the SRAM and the DRAM. However, when the L2 cache DRAM array is placed on the same chip as the processor, the time needed for two chip-to-chip crossings is eliminated. Since these crossings require off-chip drivers and receivers and must be synchronized with the system clock, the time involved is substantial. This means that as the processor frequency increases as a result of better designs and scaled technology, a larger percentage of the time is spent on these chip-to-chip crossings.

Building the L2 cache with DRAM technology and moving it on to the same chip as the processor eliminates the chip-to-chip crossings. It also eliminates the stages of delay associated with the off-chip circuitry. In addition, the bus width between the L1 and L2 levels can be made much wider. A wider bus makes it possible to transfer an entire cache line in one or two cycles compared to the multiple cycles needed when the bus goes between chips. For the latter case, the bus width is limited by simultaneous switching noise and available input/output (I/O) pins. Improved bus utilization with the on-chip L2 cache DRAM array and the elimination of trailing edge effects also contribute to the system performance. Trailing edge effects is the additional delay resulting when the first data transfer restarts the processor and the next data needed is further down the chain of multiple cycles.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
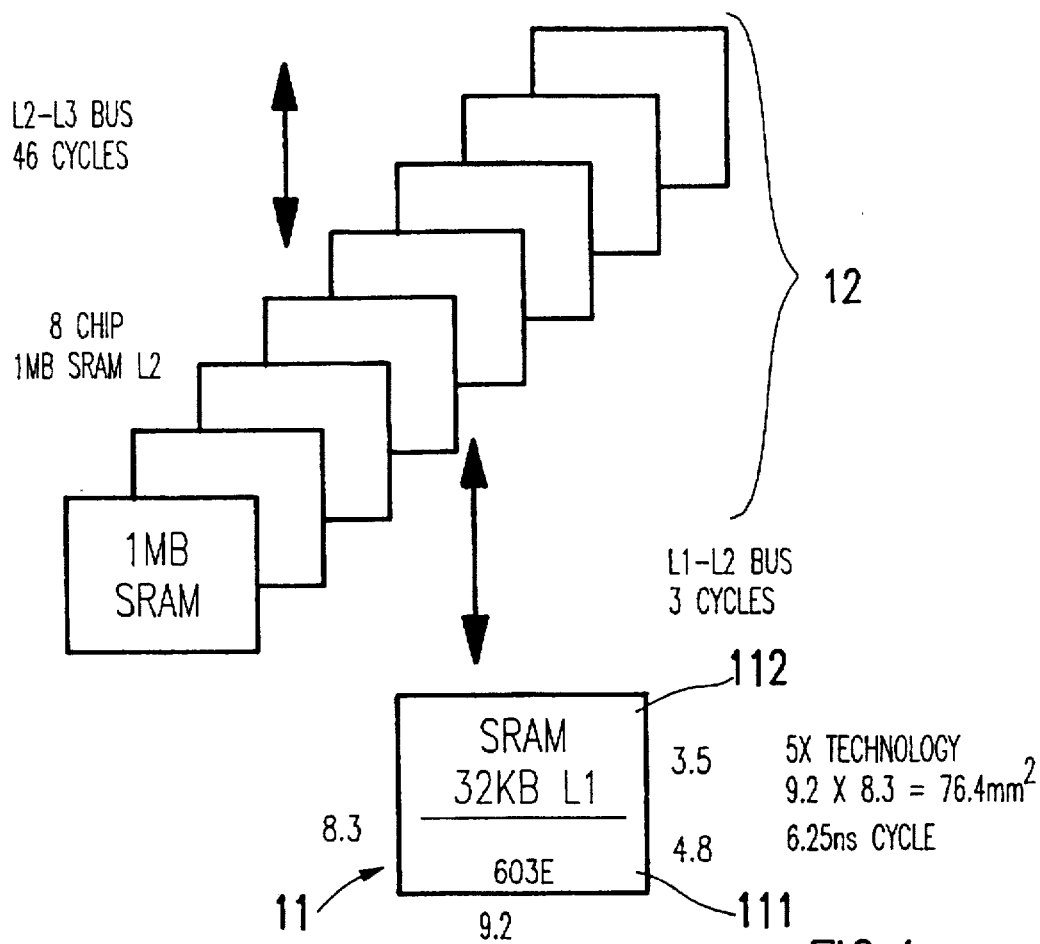
FIG. 1 is a block diagram showing a conventional memory hierarchy.

Referring now to the drawings, and more particularly to FIG. 1, there is shown an example of a conventional memory hierarchy. This hierarchy, for purposes of illustration, comprises processor chip 11 composed of microprocessor 111, such as, for example, an IBM 603E PowerPC® or similar microprocessor, having integrated on the same chip a 32 Kb L1 SRAM 112. An eight chip 1 Mb SRAM 12 constitutes the L2 cache. In case of an L1 cache miss, three or more cycles are required to access data from the L2 SRAM cache. The next level of memory, or L3 (e.g., main memory), can require forty to eighty or more cycles to access data in case of an L2 cache miss.

Figure 2:
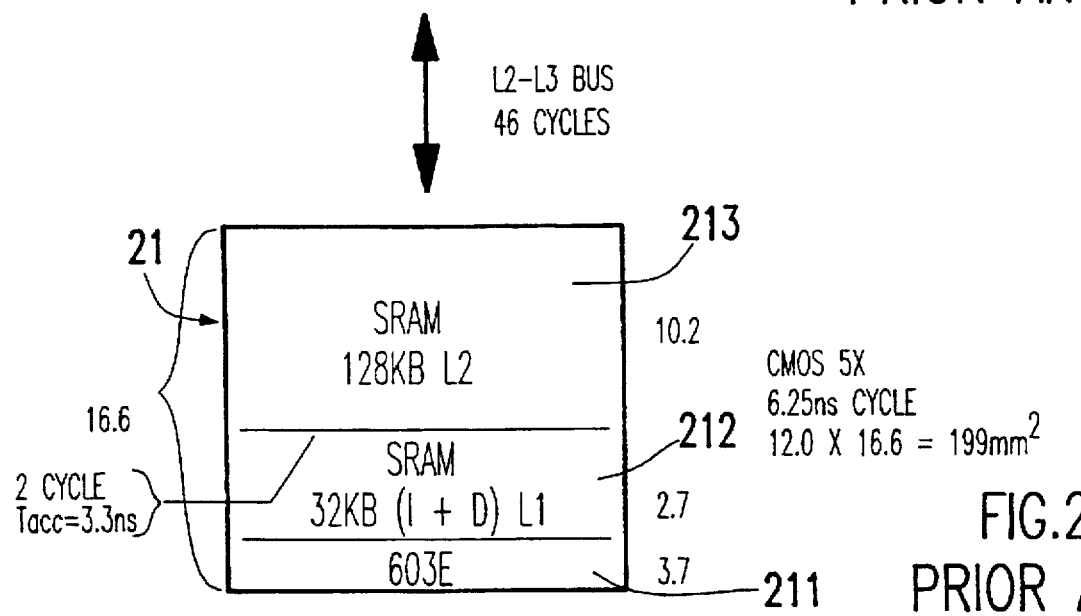
FIG. 2 is a block diagram of a single chip integrated processor and L2 SRAM cache.

FIG. 2 shows a single chip 21 on which, in the example described, an IBM 603E PowerPC® microprocessor 211 has been integrated with a 32 Kb L1 cache 212 as in FIG. 1, this cache being divided into instruction (I) and data (D) caches. In addition, a 128 Kb L2 SRAM cache 213 is integrated on the same chip. A two cycle access time is required to access data in the L2 cache in case of an L1 cache miss. This approach is an example of trading off L2 cache capacity for reduced latency.

Figure 3:
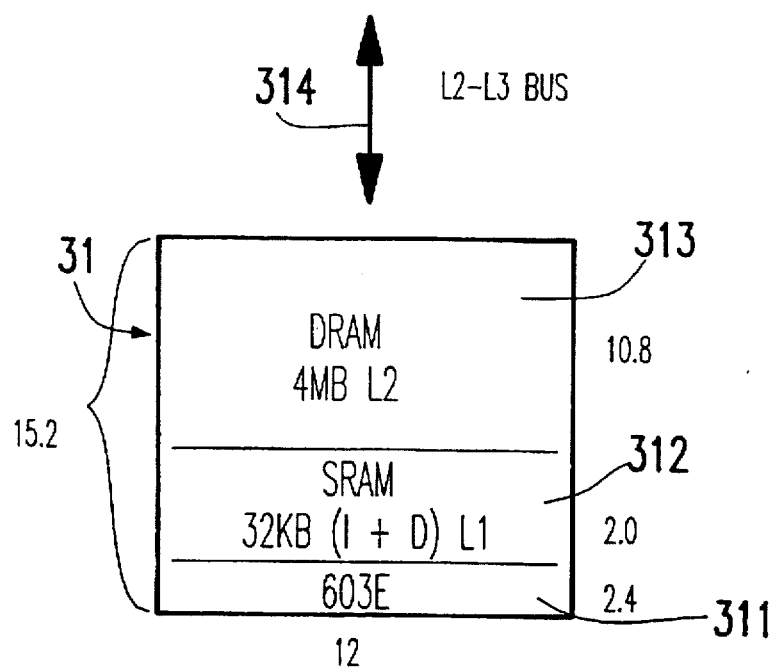
FIG. 3 is a block diagram of a single chip integrated processor and L2 cache DRAM array according to the invention.

The present invention is generally shown in FIG. 3 as a single chip 31 where again, in the example described, an IBM 603E PowerPC® microprocessor 311 has been integrated with a 32 Kb L1 cache 312 divided into instruction (I) and data (D) caches. On the same chip, there is a 4 Mb L2 cache 313 comprising a DRAM array. This cache has a four cycle access time but a greatly increased capacity. Between the L1 cache 312 and the L2 cache 313, there is a high-bandwidth, high-speed bus. This bus is wide enough to transfer an entire cache line in one or two processor cycles. There is also a high-speed on-chip bus between the L1 cache 312 and the processor 311. Finally, there is a separate bus 314 between main memory and the L1 and L2 caches.

The technology for merging a DRAM array with a processor is an important issue. DRAM processes are normally optimized for density and cost, not performance, whereas logic and SRAM processes are optimized for high performance and multiple wiring layers. However, this technology exists and is being refined.

Figure 4:
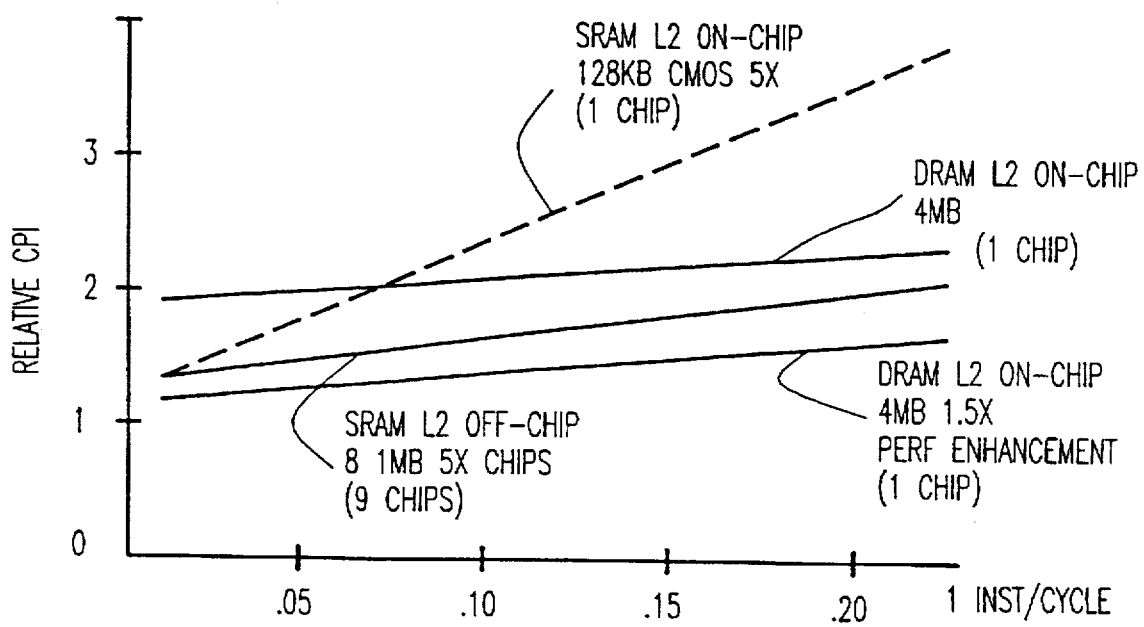
FIG. 4 is a graph showing a performance comparison of processor and memory system performance for the architectures of FIGS. 1, 2 and 3.

The relative performance of the three systems shown in FIGS. 1 to 3 are compared in FIG. 4. The relative cycle time of each of the different cases that are analyzed versus miss ratio of the on-chip L1 cache are plotted in the graph. Cache line size and bus width differences and trailing edge effects were not included in this analysis. Including these effects in the performance modeling would result in a relative cycle time improvement for the cases where the L2 cache is integrated on the processor chip (FIGS. 2 and 3) and a degradation for the conventional off-chip L2 cache (FIG. 1).

The results of the performance comparison shown in FIG. 4 give insight into the advantages of the integrated L2 cache DRAM array according to the invention. A comparison of the performance of a single chip integrated L2 cache DRAM array with the conventional approach with processor and L1 SRAM cache on one chip and the L2 SRAM cache on separate chips yields slightly better performance for the merged or integrated approach because of the four times larger L2 cache DRAM array. As mentioned earlier, it is possible to replace the off-chip L2 SRAM cache with an on-chip L2 cache DRAM array because the DRAM density is roughly sixteen times that of a SRAM in the same technology generation. For the conventional nine chip case shown in FIG. 1 versus the single chip integrated case shown in FIG. 3, the most significant difference is in the cost of the silicon and packaging. This results in much lower cost for the integrated L2 DRAM cache compared to the conventional approach. For the case where an L2 SRAM cache is integrated on the processor chip as shown in FIG. 2, the silicon areas are roughly equivalent but the capacity of the integrated L2 SRAM cache compared to the integrated L2 DRAM cache is considerably smaller due to the less dense SRAM cell. For the two cases shown in FIGS. 2 and 3, there are provided single chip solutions with roughly equivalent silicon areas and packaging but very different L2 cache sizes. Comparing these two cases, results in better cost for the integrated L2 DRAM cache solution of FIG. 3. Moving the DRAM onto the same chip as the processor with a corresponding improvement in the DRAM device results in considerably better cost compared to either a large off-chip conventional L2 SRAM cache (FIG. 1) or a smaller L2 SRAM cache integrated on the same chip as the processor (FIG. 2).

An important feature of the integrated L2 cache DRAM array is that the system performance is much less sensitive to miss ratio than the conventional approach. This allows a wide range of problems with widely varying miss ratios to be processed without compromising the relative CPI, as demonstrated in FIG. 4. As a modification to the basic system shown in FIG. 3, the L2 cache can be a combined SRAM/DRAM array where the SRAM acts as a high speed front-end buffer for the DRAM array, further improving performance.

Another advantage of the integrated L2 cache DRAM array is lower power compared to the other approaches. For the integrated L2 cache DRAM array with the enhanced device, the integrated L2 SRAM cache, and the conventional off-chip L2 SRAM cache, the processor frequency will be about the same. The conventional L2 SRAM cache case (FIG. 1) will have considerably higher power due to the number of chips and chip crossings. The integrated L2 SRAM cache (FIG. 2), although a single chip solution like the integrated L2 cache DRAM array (FIG. 3), will have higher power due to the higher miss rate of the small L2 SRAM cache which results in more power being dissipated in the off-chip drivers and receivers.

If power and not performance is the driving force, the integrated L2 cache DRAM array without the enhanced device offers an extremely attractive alternative. Because of the slower DRAM device, the processor frequency will be about two thirds of the other cases. It possesses the same power advantages as the integrated L2 cache DRAM array with the enhanced device at two thirds the power with the standard DRAM process. For portable applications where this performance is adequate, this is an extremely attractive approach.

In a memory hierarchy when data is requested, there has to be a mechanism to determine whether or not the data in the cache corresponds to the data requested since each cache location can contain data from a number of different memory locations in a set associative cache. Tag arrays are added to the cache to identify whether the requested data corresponds to the data stored in the cache. For set associative caches, a number of locations must be searched. In order to reduce latency, the tag arrays are accessed in parallel with the cache and should be as fast or faster than the cache. The size of the cache array is directly proportional to the number of stored lines in the cache. For the case where the cache consists of more than one chip, the tag array will be on a separate chip. For those cases where the cache is integrated on the same chip as the processor or is on a single chip, the tag array is typically integrated on the same chip as the cache. Having the tag array on a separate chip can add cycles to the path because of the delays from the additional chip crossings. Conversely, a separate tag array can have a size advantage.

The integrated L2 cache DRAM array because of its large capacity requires a large tag array. This would seem to be a problem for the integrated L2 cache DRAM array. If the tag for the integrated L2 cache DRAM array were implemented in the conventional manner with SRAM arrays, it would not be practical. To solve this problem, the tag array is built using DRAM arrays. The sixteen times density advantage of the DRAM array compared to SRAMs makes it possible for the tag array to fit in a reasonable area. Also, because of the high L1/L2 bandwidth of the integrated L2 cache DRAM array, it is possible to use a large cache line. This reduces the number of entries and thus the size of the tag array. The combination of the DRAM density and smaller number of entries makes it possible to integrated the DRAM tag array on the same chip as the processor and the L2 cache DRAM array with only a small impact on density. For the integrated L2 cache DRAM array of FIG. 3, the tag array is less than 100 kilobits (Kb) for a 4 Mb L2 cache DRAM array. This is considerably smaller than the cache array. Therefore, it is possible to access the tag array in parallel with the cache access and do the compares needed for set associativity without adding any additional latency to the path.

Figure 5:
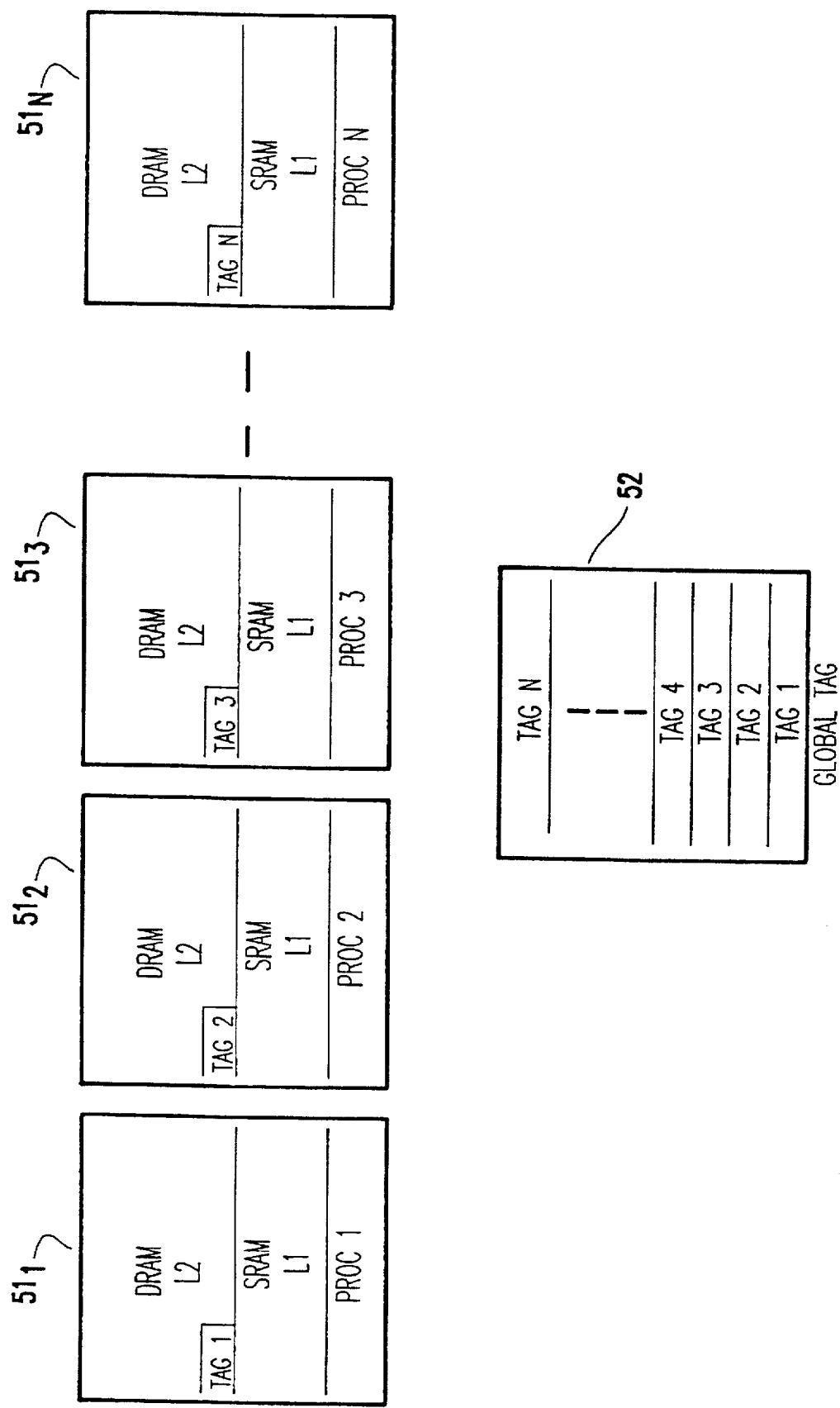
FIG. 5 is a block diagram showing a loosely coupled multiprocessor system comprising a plurality of processors with on-chip L2 cache DRAM arrays according to the invention.

The ability to integrate a large L2 cache DRAM array and its tag array on the same chip as the processor has an advantage for loosely coupled multiprocessor (MP) applications. The basic building blocks for a loosely coupled and expandable MP system are shown in FIG. 5. Two building blocks are needed. The first consists of a processor with integrated L1 SRAM cache and L2 DRAM or SRAM/DRAM combination cache plus a local L2 DRAM tag array. A plurality of these are shown in FIG. 5 denoted by reference numerals $51_1$ to $51_N$. The second building block consists of a global tag array 52 that has entries for each of the individual L2 caches. In the 64 Mb DRAM technology time frame, the integrated L2 DRAM cache can be in the range of 4 megabytes (MB) to 6 MB. For 256 Mb (0.25μ) technology, the capacity of the integrated L2 DRAM cache will increase to 16 Mb to 24 Mb. For MP applications, it should be possible to partition the job stream so with that these large capacity on-chip L2 DRAM caches, the miss ratio is very small. If an L2 cache miss occurs in one of the processor chips, then the global directory 52 would be searched to see if the data resides in one of the other L2 caches or main memory must be accessed. The sequence of operations for the MP configuration of FIG. 5 are as follows:

For processor i hit, the data will be found in the L1 SRAM cache.

For a miss in L1 cache, got to the L2 tag array for the processor.

If there is a hit in the L2 tag array, continue.

If there is a miss in the L2 tag array, go to the global tag array.

If there is a hit in the global tag array, the data resides in the L2 cache of another processor and must be retrieved.

If there is a miss in the global tag array, data must be retrieved from main memory or a lower level in the memory hierarchy.

The loosely coupled MP system in FIG. 5 is easily expanded to more processors simpley by adding additional processor chips and expanding the global tag array 52. Cache coherency is maintained by giving each processor exclusive read and write access to the data in its L2 DRAM cache. Obviously, data that was read only would be shared by multiple processors. The total L2 cache size would be proportional to the total number of processors. Having the L2 cache grow or expand with the number of processors versus an L2 cache that has a much smaller fixed size is much more powerful. Rather than having each processor share the same data in this loosely coupled MP system, jobs would be partitioned so each processor would perform an entire task with its data. The large integrated L2 DRAM cache makes this feasible.

The integrated L2 cache DRAM array makes use of multiple ports and buffering to further improve the system performance for the single processor and multiple processor applications. There is a dedicated on-chip port between the processor and the L1 SRAM cache. There is a wide on-chip port between the L1 SRAM cache and L2 cache DRAM array so an entire cache line can be transferred in one or two clock cycles. There would also be a shared port to main memory from the L1 SRAM cache and L2 DRAM cache. The details of porting are similar to that described in U.S. Pat. No. 5,388,072 to Matick et al. The same dual buffering as described therein is used in the present application between the L1 SRAM cache and the L2 cache DRAM array. This approach eliminates the congestion and cycle penalty that can occur when casting out old data and bringing in new data both during an L1 cache miss and an L2 cache miss.

The description thus far has focused on integrating a processor and L1 SRAM cache and L2 cache DRAM array on a chip where L2 cache sizes from 4 MB to 6 MB in 64 Mb technology and 16 MB to 24 MB in 256 Mb technology are possible. For many systems, greater than 16 MB of memory may be adequate for the entire main memory. Thus, an integrated processor plus L1 cache plus main memory constitutes a "true" system-on-a-chip.

It is also possible to integrate multiple processors with memory hierarchies in a single chip. For instance, in a technology using 0.25μ minimum lithographic capability, multiple processors (e.g., four processors comparable to IBM 604 PowerPC®), each with its own L1 cache, plus a second level L2 cache, plus all the interfacing electronics can be included on a single chip to make the two levels of cache work without any additional "glue" chips (of course, a separate main memory and system control unit are needed as discussed later). Such a chip could operate as a stand-alone multiprocessor system (e.g., four-way MP), or be integrated into a larger system using multiple node chips, to give higher levels of multiprocessor configurations. The possible configurations for such a "node" chip depend on the application as well as a number of design/performance tradeoffs. These are described below.

I. Basic Processor Node Chip Using Private L1 & L2 Memory On-Chip

The configuration in FIG. 5 shows each chip containing a single processor with its L1 and L2 caches, including translation logic (directory/tags, etc.). In a multiprocessor "node" chip, there are multiple such configurations integrated on one chip, with other essential functions to make it work, and give improved performance over just simple integration of several previous chips. The first case, shown in FIG. 6, employs a private L2 cache organization. This would be the preferred embodiment for typical scientific workloads, since large, private caches generally give better performance due to the large data structures and minimal sharing.

Figure 6:
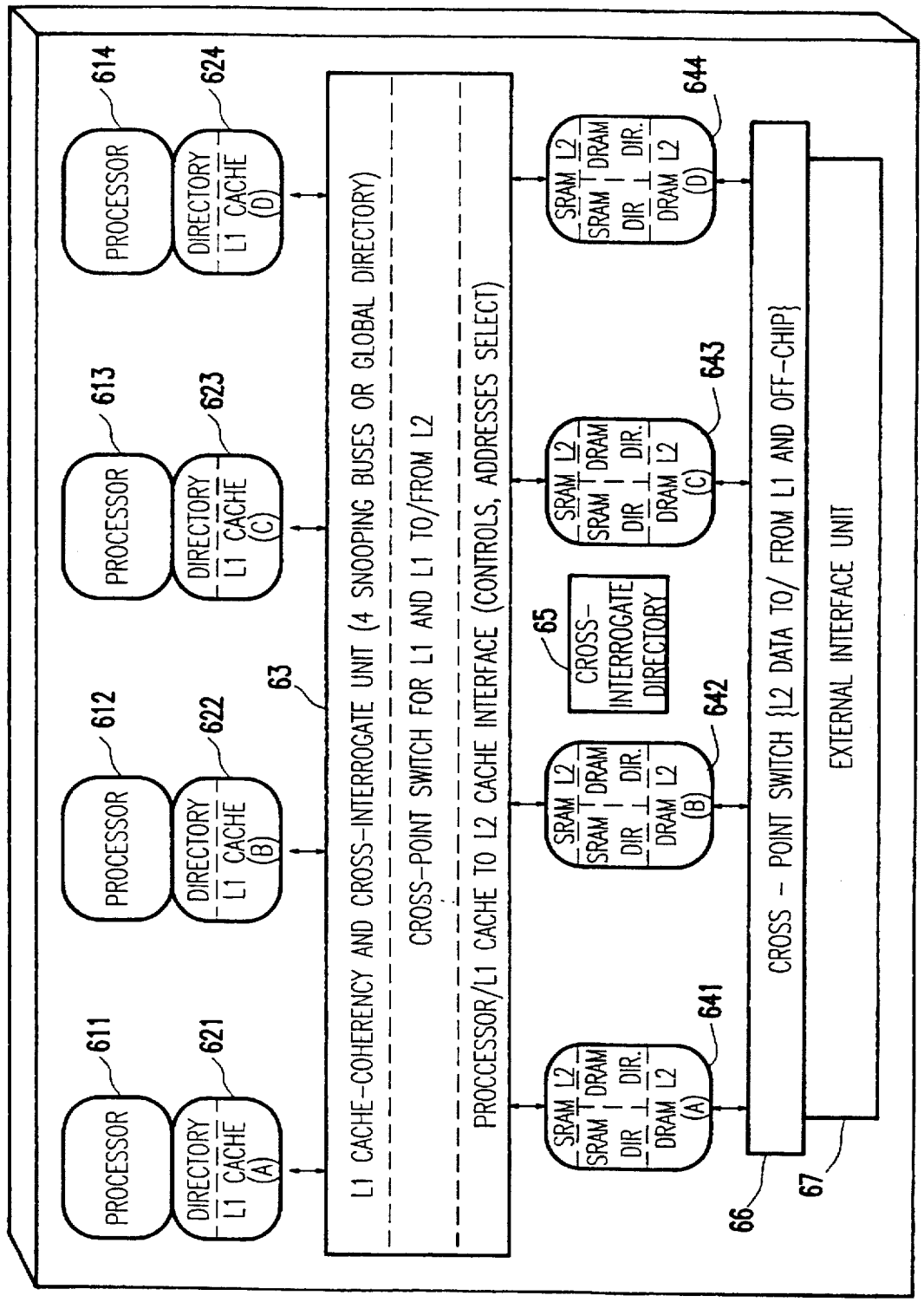
FIG. 6 is a block diagram of a single chip multiprocessor system with integrated private L1 and L2 caches.

In the example shown in FIG. 6, there are four processors 611 to 614, each with its own L1 cache 621 to 624, respectively. For such a chip having four processors, each of the four L1 caches would appear logically to be separate and distinct from each other as previously used in the embodiment of FIG. 5. Each L1 cache has its own directory which can have, for instance, a four-way set associative, late select organization (or other as determined by performance). For private caches in a uniprocessor configuration, each L1 directory and cache array, as should be obvious, need be only one-ported. However, in this multiprocessor (MP) configuration, since any block (line) can reside in multiple L1 caches with read permission, an attempt by any one processor to modify such a line will require some coherency mechanism in the other L1 caches. There are several options available, as follows:

1. The other caches can all update the same line simultaneously (e.g., four separate buses, one for each cache), thereby maintaining a corrected copy in each cache where it appears.

2. Each of the other caches with read permission can invalidate this line to be modified and grant exclusive use to the modifying cache.

3. A combination of these protocols, or any of many other coherency protocols, can be used.

High levels of integration permit arrays with larger and more complex structures to be implemented while still maintaining high speed. Such arrays can be multiported in the strict sense (i.e., multi-port cell) or replications of identical arrays, or combinations. Large, multiple data buses in and out also facilitate the realization of such multi-operation structures. Address registers, decoding, word/bit driving circuits, and data in/out paths can be highly integrated to minimize loading delays as well as circuit count. This close integration of array circuits, peripheral circuits, and the bus lines to be driven are essential in order to improve speed while adding complexity.

The use of such integration capability permits the design of a multi-processor "node" chip (e.g., four processors in the example illustrated) having four L1 caches on-chip, with four independent buses integrated on-chip is the preferred embodiment. However, in order to provide the highest speed, such a coherency implementation requires additional ports into each cache array as well as directory; in fact, four ports into each for the case illustrated, one for each processor. Such a four-ported organization allows, for instance, all four caches to be updating a given L1 line on the same cycle. Since this does not happen very often, a more cost effective design is possible with only small degradation in performance. This cost/performance tradeoff reduces the preferred embodiment to the following.

Each processor/directory/L1 has a base configuration consisting of a four-way set associative directory and array organization with the array structured as a late-select organization, meaning the congruence class from the directory (for address translation) is accessed at the same time as the congruence class of data from the array. A "late-select" signal generated by the match in the directory selects the correct data item from the array congruency class. While a set-associative late-select organization is not essential, it is typical of standard cache designs for performance reasons, and is chose as a base. With such an assumed organization, then for cache coherency, each directory is four-ported using four separate buses, which allows the congruence class of each processor to be searched in each directory, on the same cycle. The arrays are not four-ported, since this can significantly reduce density and speed, only the directories are four-ported in the preferred embodiment. Obviously, the array could be four-ported for better performance, if size and speed can be maintained. For any given (local) cache, the normal path is always followed on a normal (local) access. In addition, the other (non-local, or remote) processor paths into a given directory may or may not be asserted, depending on the circumstances. For any normal read access into, for instance, L1 cache 621, which could potentially miss on any access, the read request with associated address is sent to all four directories for simultaneous interrogation. Suppose a miss occurs in the directory of L1 cache 621 while a hit to this desired block (line) occurs in the directory of L1 cache 623. Now if L1 cache 623 happened to be doing a local access for processor 613, then this access would go to completion. On the next cycle, cache array 623 would be accessed for the line needed by processor 611 and latched into a reload buffer (if necessary) so as to be available to processor 611 on the subsequent cycle. A selector/crosspoint switch 63 with a bus width equal to a cache line width or half-line width is included on-chip. Thus, this remote line can be transferred from one cache (e.g., L1 cache 623) to L1 cache 621 in one or two cycles which is a substantial improvement over current organizations. The L1 caches have arrays organized in pseudo-two-port fashion and each L1 array includes four full cache line-width reload and four store back buffers similar to that disclosed in U.S. Pat. No. 4,905,188 to Matick et al. Such buffers allow a multi-cycle transfer of cache lines from the edge of one cache to the edge of another, and a one cycle read/write from buffer to and from the array. Some compare and priority logic is required to assist the operating system in maintaining the appearance of "in-order execution" of multiple stores on a given cycle. These details are highly system dependent but are straight forward in design. Such buffers for L1 to L1 transfer would not be needed if the L1 arrays, busses, cross-point switches and supporting logic can be made fast enough to provide one cycle for full access, transfer and late write of a full line. However, L1 line Store Back and Reload Buffers would still be required for interfacing to each L2 array.

These buffers are used to interface between caches L1 to and from L2 as well as from L1 to and from L1 as described here. In the event that the L1 arrays and logic can eventually be made fast enough, then the above case of a fetching a remote line from L1 cache 623 and storing it in L1 cache 621 would be done directly, on one cycle without need for an intermediate buffer. In this case, these reload and store buffers would be used mainly for multi-cycle transfers to and from L2 and L3.

If processor 611 originally requested a local store to a read/shared line as signaled by coherency control bits stored with each entry in each directory, the late select signal to cache array 621 would be stalled until an acknowledge signal was received from all the non-local caches. This acknowledge signal would indicate that the other caches do not contain this line at this time, or if they do, it has been invalidated. If acknowledge is asserted, cache array 621 enables the accessed line to be stored into (written), and its directory marks the line as owned exclusively. The implication is that a cache line can be modified only if it is owned exclusively, which is one possible coherency protocol. Others are possible, as discussed in the more detailed description of the coherency bus below. The shared-modified coherency protocol described below is preferred for performance reasons, in a technology with a sufficient level of integration.

When a line which is already owned exclusively is accessed, the acknowledge responses of the other cache directories are ignored and the access proceeds without stall, except for some special circumstances. Similarly for a read access to any read/shared line. Thus, the integration of the processor with memory hierarchy on-chip allows for improvement in both the cache coherency performance as well as the reload time from a "remote" cache.

If an unmodified line is required by cache 621 and it resides in cache 624 as well as in L2 cache 641 to 644, it can be obtained via the fastest path. This will usually be from L1 cache 624 since an interrogation of L2 will normally take several cycles longer than L1.

For the case shown in FIG. 6, the L2 SRAM/DRAM cache 641 to 644 can be envisioned as an extension of the smaller L1 caches. Such a design is very desirable in large computations, and for cases where the on-chip L1 cache is very limited in capacity due to the low density capability of SRAM technology. The L2 cache shown effectively increases the capacity of the L1 cache with a very small finite-cache penalty resulting from misses in L1 cache. In order to achieve improved L2 cache performance, a number of other on-chip features are included, discussed below.

Each SRAM and DRAM has its own private directory as shown in FIG. 6. In order to maintain coherency between the private L2 caches 641 to 644, a four-bus protocol similar to that above for the private L1 caches can be used. However, since the access demand on the L2 caches will typically be much smaller that on the L1 caches, four simultaneous accesses into any directory is seldom necessary. A simpler structure, such as a global directory 65, is preferred to perform cross-interrogation of all the L2 caches whenever a miss occurs in any one of the private L2 caches. Thus, each L2 cache has its private directory for fast normal accesses, supplemented by the global directory 65 for miss/cross-interrogates. This global directory 65 is one-ported since multiple misses in multiple L2 caches on the same cycle will occur infrequently. Multiple L2 misses are queued to the global directory 65. Such an organization using both private and shared directories provides minimum of delay for both local and "remote" reload paths which is essential as the cycles per instruction continues to decrease.

This organization allows the L2 caches 641 to 644 to be either locally inclusive (all lines in a given L1 cache above a given local L2 cache must be present in the local L2 cache), globally inclusive (all lines in the four L1 caches must be somewhere in the four L2 caches), or non-inclusive (lines in L2 cache can migrate out independently of whether or not this line is in L1 cache). The locally inclusive implementation requires movement of lines between two L2 caches when the line is moved from L1 cache to another L1 cache, or from a local L2 cache to some remote L1 cache. This is seldom used but could be desirable if a store-through L1 cache policy is used.

In all cases, and especially for the Snoopy protocols, the cache directories have a late-write capability, meaning they will be capable of accepting and completing the writing of updated data into the array very late in the cycle. Typically, a read access is made to a given word, some logic is performed on part of this data, and a write operation is subsequently performed on the same word. Thus, the data and bit address for the write operation are not known until very late in the cycle. For directories implemented in dynamic logic and/or DRAM technology, such directories use special output circuits which hold the word line active and drive the new data into the array cells without the need of column address strobe (CAS), row address strobe (RAS), or precharge. The data input path thus does bit line decoding and sense amplifier overdriving within a very short data-in window to complete storage of the data within one cycle. A similar feature is used on the DRAM arrays to allow end-of-cycle writing into the selected logical word of a congruency class in a late-select organization. This function can be provided in a manner similar to that described in the aforementioned U.S. Pat. No. 4,905,188 to Matick et al. This feature is assumed in all cases discussed below.

A path selector/cross-point switch 66 to connect any L2 cache to any L1 cache, as well as for off-chip connections, is integrated into the output of the L2 cache as shown in FIG. 6. The external interface unit 67 is via an off-chip memory controller for controlling any off-chip memory components. Of course, all memory management logic and hardware needed for on-chip control is provided on-chip as described. The details of the control logic are not included in this description since such control logic is conventional. This architecture allows the external memory controller to be a standard component which greatly simplifies the design and structure of such a system.

The above structure, which uses coherency at both the L1 and L2 levels, gives a number of advantages in terms of overall system performance. In addition to providing a fast reload and cross-interrogate capability at the L1 level, the same independent capability at the L2 level permits any of the L1/L2 policies of locally-inclusive, globally-inclusive, or non-inclusive to be used with no serious performance impact. For instance, if a locally inclusive policy is adopted, then when a line is moved directly from, say, L1 cache 623 to L1 cache 621 over the L1 transfer buses, the line in L2 cache 643 must also be moved to L2 cache 641. This can be done separately, on the L2 transfer buses without interfering with the L1 caches.

II. Basic Processor Node Chip Using Shared L2 Cache On-Chip

Figure 7:
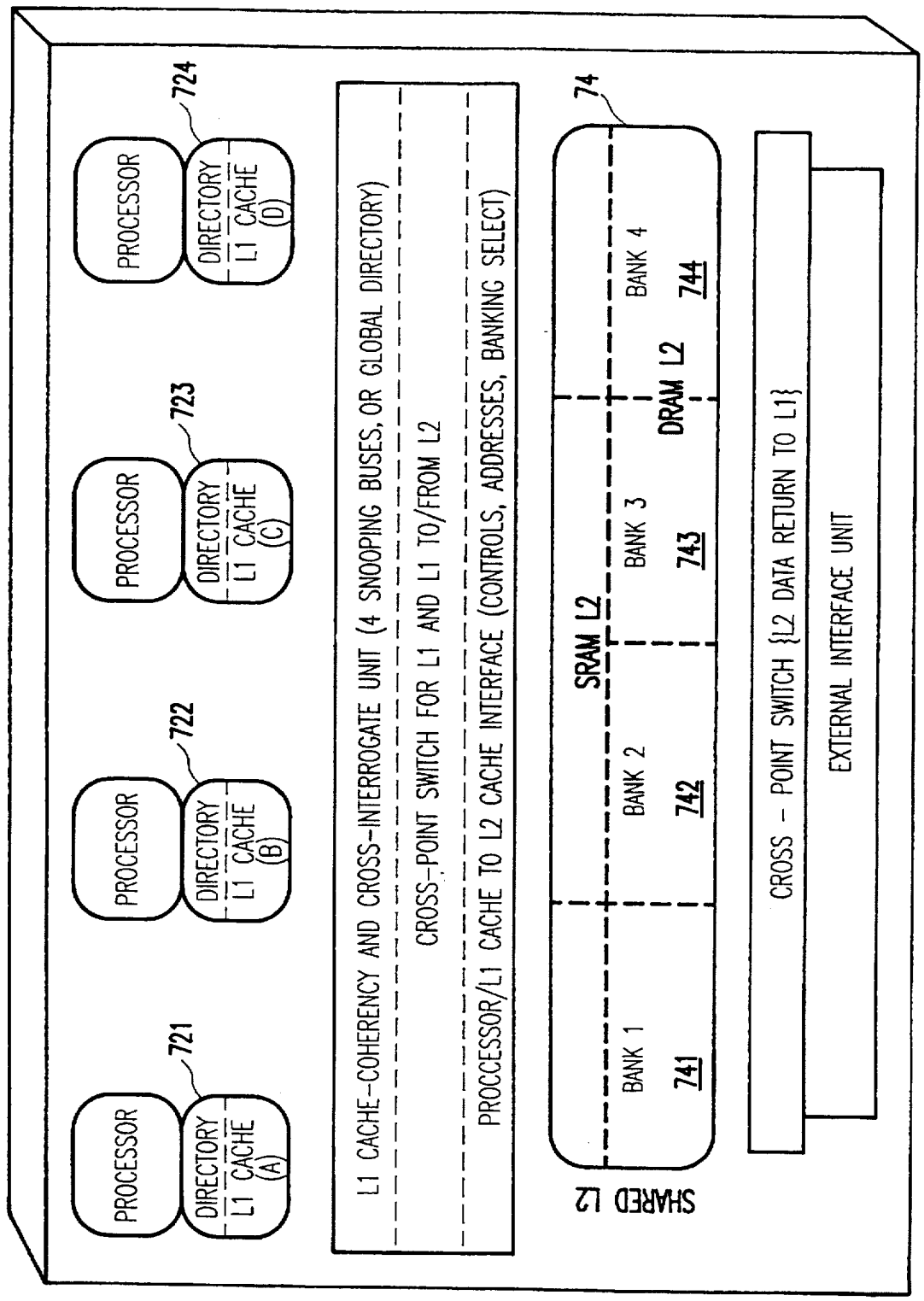
FIG. 7 is a block diagram of a single chip multiprocessor system with integrated private L1 and shared L2 caches.

The L2 SRAM/DRAM cache can be organized as one large shared cache as shown in FIG. 7. For a large number of applications such as commercial workload processing, such a configuration typically gives better performance in a multiprocessor system.

In order to improve performance, the shared L2 cache 74 is made to appear pseudo-four-ported. This is done to provide access for misses in all four L1 caches 721 to 724 simultaneously, for certain cases, as follows.

The one large L2 cache 74 is physically configured into four separate banks 741 to 744 where each bank can be accessed independently (each has its own clock, drivers, decoders, etc). In a typical organization using banks of this type, there is one address register/bus and one data I/O bus to the entire bank. Such an organization allows the accesses to be interleaved to achieve some speed-up (e.g., see U.S. Pat. No. 4,854,677 to Chappell et al.). For instance, if the bank access time is, say, 40 nanoseconds (ns) and the system cycle time is 10 ns, then four sequential accesses to the four-bank memory can each be started on a 10 ns cycle if each access is to a different bank. Such interleaving is very effective for a one processor system. For a four-way MP system as used here, four simultaneous requests to L2 cache are possible, and can add substantial additional cycles to the reload time. As mentioned previously, it is desirable to avoid any such additional cycles for fast processors. In the current case, this will be achieved with a minimum of additional complexity by allowing four simultaneous accesses as follows.

Each bank 741 to 744 can support one access from any of the four processor/L1 caches, so if each processor is accessing a different bank of L2 cache, all four accesses can take place simultaneously. However, if multiple accesses are directed to any one bank, they can occur only serially in that bank. Of course, all cases in between, namely the four addresses hitting three banks, and two banks, are possible.

Figure 8:
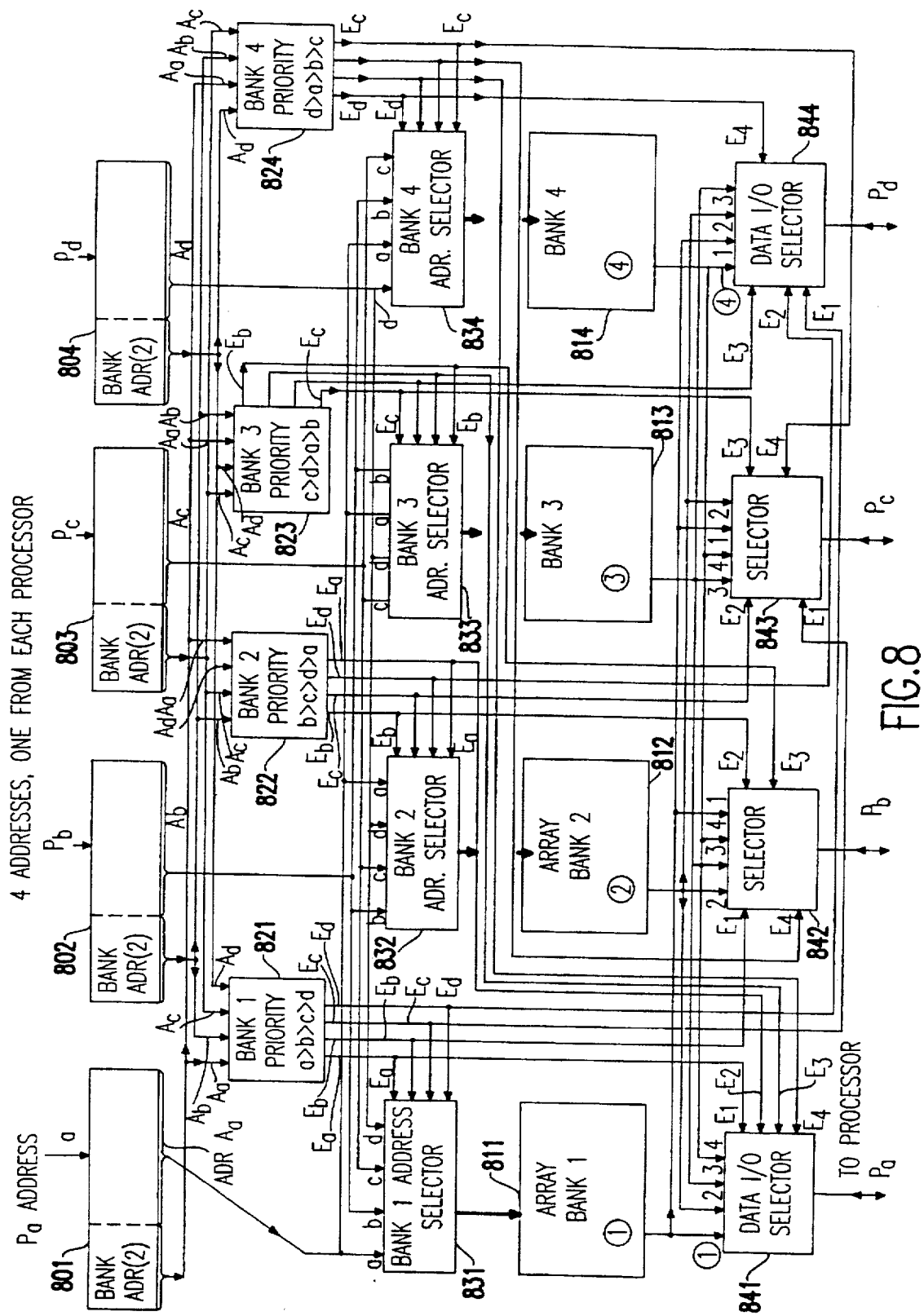
FIG. 8 is a block diagram of a shared memory using pseudo-four-port (banked) structure with non-integrated data-I/O selectors and enable signals.

The basic structure is shown in FIG. 8. Four address registers 801 to 804, one from each processor, supply the input requests (the access control lines are not shown). For the case of a system using a store-in L1 cache, these input addresses would be for an L1 block (line). If a store-through L1 cache is used, these addresses could be double word addresses or whatever the unit of store-through is used. In the latter case, there are some additional queuing registers (buffers) for holding possible multiple store-through writes to a given bank. In either case, since any address can go to any bank 811 to 814, bank address decoder and selectors are necessary. The bank address decoding is done by each of the four bank priority functions 821 to 824 shown in FIG. 8. Each of these has the two bank address bits from each processor as inputs and generates four selector enable signals, Ea, Eb, Ec, and Ed with a certain priority. While other priority schemes are possible, we select one which will give a uniform distribution for a random scattering of processor accesses to a random scattering of lines in the banks. Bank 811 priority is address Aa first (if asserted), Ab second, Ac third, Ad fourth. The remaining bank priorities are all stepped by one and accessed in a round robin fashion as below:

Bank 811 Aa, Ab, Ac, Ad
Bank 812 Ab, Ac, Ad, Aa
Bank 813 Ac, Ad, Aa, Ab
Bank 814 Ad, Aa, Ab, Ac Thus, any bank can get any address, and if all four bank addresses (two bits each) are different, then four simultaneous accesses can be made, one to each bank. These accesses are controlled by bank address selectors 831 to 834.

The data coming out of each bank must be capable of returning to any of the processors/L1 caches. For a non-integrated configuration in which the arrays are on separate chips, for instance, single data I/O ports (tri-stated) from each chip would be dot-ORed off-chip and bused into separate, non-integrated data I/O selectors similar to that shown in FIG. 8. This has two serious drawbacks. First, the selector circuits 841 to 844 cannot be tightly integrated to the array banks. Second, the enable signals generated by the address bank priority logic must be distributed all around the four bank I/O selectors. As can be seen, this does not lend itself well to efficient integration on-chip.

Figure 9:
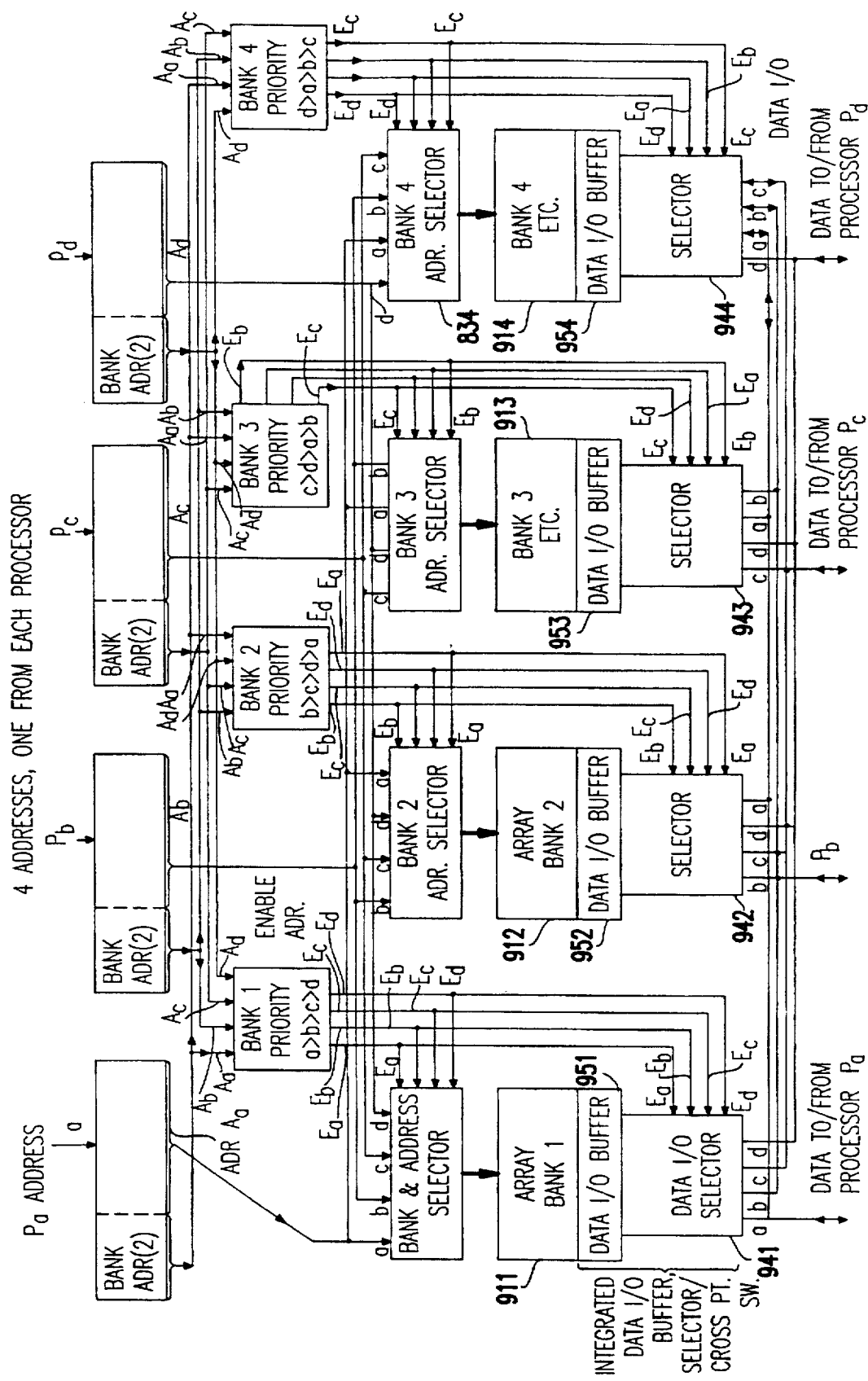
FIG. 9 is a block diagram of a shared memory using a pseudo-four-port (banked) structure with integrated address input and data I/O selectors.

In order to get a highly integrated, high speed system on-chip, the preferred embodiment for this interconnection is provided by the data in/out selector function shown at the bottom of each data array in FIG. 9. By use of this implementation, the I/O selectors 941 to 944 can be closely integrated with the respective data-out buffers 951 to 954 of the array banks 911 to 914, and the OR busing to each processor can be done outside the array and data I/O structure. A further advantage is that the data selector enable input signals are the same as those used for selecting the addresses. These signals are all used only locally within a given bank region, thereby simplifying the integration, layout, speed, density, etc.

For the L2 directory organization, there are several choices. It can be logically identical to the L1 directory, requiring a true four-port organization, or it can be bank organized wherein it appears to have four ports only if the addresses to be translated all fall into the separate banks, similar to the L2 array described organization above. In order to maximize the L2 cache capacity and speed, the preferred embodiment is a four bank organization. However, this will compromise the overall system performance for cases where the four addresses do not each hit on a separate bank. The probability of multiple misses to the L2 cache occurring on the same cycle to the same bank is small so the banked organization is desirable when there is insufficient space on the chip. As the chip density increases, thus allowing larger array capacities, a multi-ported L2 directory and even array could be used if desirable for additional performance.

In order to reduce reload latency due to an L1 cache miss, the L2 DRAM cache has a SRAM array interface to the L1 cache as shown in FIG. 7. The preferred embodiment would again be a banked L2 cache organization, for similar reasons. The organization and interfacing between the L2 SRAM and DRAM could be (in the preferred embodiment) similar to that described in U.S. Pat. No. 5,388,072 to Matick et al.

The L2 cache interfaces to an off-chip L3 memory (e.g., main memory) by way of a simple, interface unit 76 which has, in addition to a multi-word data bus, sufficient control signals to be able to communicate with a relatively standard memory control unit (MCU) on a separate chip. This communication would signal the need for reload from L3 memory, provide the target address and return destination for proper reload to L2 cache via the data I/O selector (equivalent to a cross-point switch). Only one such command/address and data bus path is the preferred embodiment for off-chip communications to main memory and I/O, which could include direct memory access (DMA). Since the on-chip L2 caches will service most of the L1 cache misses (except for cold-start, which consumes only a fraction of total processing time), the off-chip misses to L3 memory will be minimal. Thus, one off-chip path will be sufficient for a wide range of problems and systems. It also provides a simple and convenient interface to standard, or separately designed memory controller chips. However, it should be recognized that nothing in the architecture or organization precludes the use of multiple off-chip paths if desired.

Under certain constraints, this shared L2 cache can serve as the coherency point for a multi-node system. This would require the shared L2 cache to be inclusive, meaning all lines in all the L1 private caches are also maintained in the shared L2 cache, and a global, cross-interrogate (XI) directory keeps track of all these locations.

III. Basic Processor Node Chip Using Shared L1 Cache and Shared L2 Cache On-Chip For certain classes of workloads, there is considerable sharing of information even at the L1 cache levels. For such cases, the multiprocessor configuration of FIG. 7 results in considerable thrashing (transferring over short time periods) of data between the various L1 caches. For such cases, better performance can be obtained if the individual L1 caches of the various processors appear logically as one large, shared cache. Such a configuration has not been used in practice because of the severe impact on the design and speed of the L1 cache. For high performance, the L1 cache must typically run at the same speed as the processor, namely one cycle per access. This is virtually impossible for previous designs with processors and associated L1 caches on separate chips. With the advent of large scale integration, this becomes possible, provided all necessary functions which impact cycle time are on-chip. Thus, this "node" will use one (logically) large, shared L1 cache as well as a shared L2 cache, all on one chip, with appropriate logic.

Figure 10:
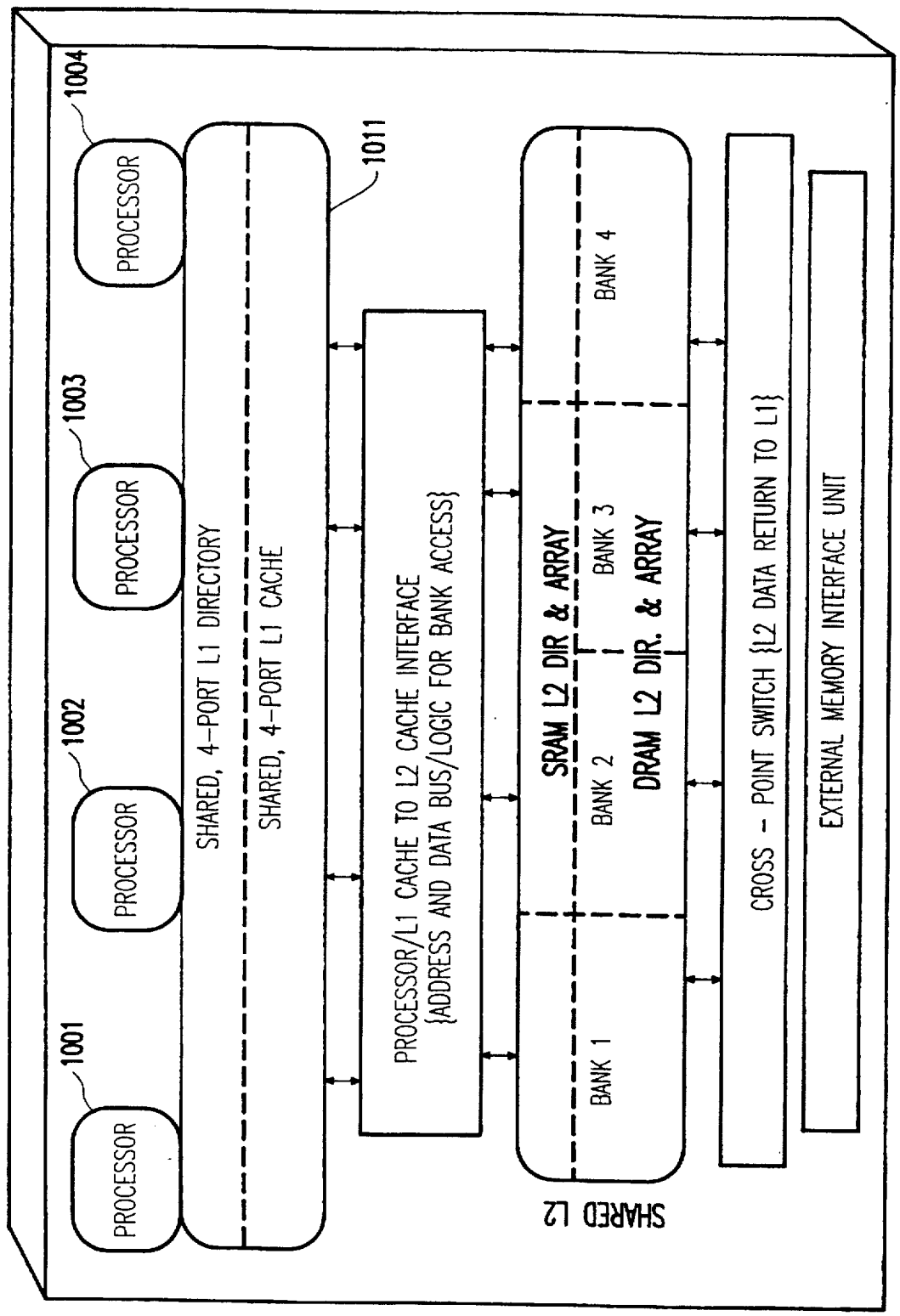
FIG. 10 is a block diagram of a single chip multiprocessor system with shared L1 and L2 caches.

For such a case having four processors and four L1 caches, the preferred embodiment is shown in FIG. 10. In order to make the L1 caches all appear as one large shared cache 1011 and give each processor 1001 to 1004 an independent and simultaneous path to the shared cache, a unified directory with four simultaneous ports for address translation is needed, one port for each processor, as shown. Each processor, on each cycle, can access the directory with a separate "effective address". This "effective address" could be the real page address obtained from a local translation lookaside buffer (TLB) if the cache is organized as a "real" cache, this being the more common form. However, the L1 caches could be accessed with the full processor-generated virtual address if the caches are organized as "virtual" caches. This just requires a large address to be stored in the cache directory for compares. This is a design tradeoff which is not important here, as either approach is acceptable.

The logical structure of the L1 cache directory appears as one large array with four independent, simultaneous ports. It can be constructed as a single array of cells with each cell having four ports (four word and four bit sense lines per cell). Alternatively, it can be implemented as four identical arrays, each with one port, and appropriate support logic to maintain the exact, same information in all four arrays. This is often the physical implementation of multi-port arrays (e.g., for multi-port register files) and is, again, strictly a design tradeoff. In either case, each processor only has to send its address to one address port on the L1 cache 1011, and likewise connect its data bus to only one L1 cache I/O port (i.e., no multiplexing is required for addresses or data I/O in the shared L1 cache).

For performance reasons, the L1 caches are organized as set-associative, either two, four or eight-way set-associative with four-way being a reasonable compromise. A direct mapped cache is also possible, but this typically gives poorer performance than a set-associative design.

For speed, the L1 caches are organized as "late-select" in which the directory is accessed in parallel with the data from the congruence class of the L1 storage array. For a four-way set-associative organization, this requires accessing four addresses and doing four compares in the directory, as well as accessing the four logical words of the congruence class from the data array. This all is required for each processor, so a total of sixteen addresses are required from the directory for sixteen compares, and accessing of sixteen total logical words from the data array. Again, the exact organization and structure is a design tradeoff and can vary significantly.

Since the L1 directory and arrays appear as one large, logical cache, coherency (due to writing to various parts of the cache) is automatic. Since any L1 block (line) appears only once in the L1 data array, it can be read or written by any of the processors which has the appropriate permission. Each directory entry for each block (line) can have permission bits for each processor and these bits can be checked on the data-out side of the directory, before the late- select signals can gate the data to the processor. A given L1 block (line) can have read/write permission bits for any number of processors. Multiple processors can write to the different words of the same line on any cycle, but to the same word will require some logic to assist the software for insuring in-order execution.

In a manner which is analogous to that above for the L1 cache, the L2 cache 1031 has a logical organization which is very similar. The L2 cache is one large, shared cache serving all four L1 caches. Since it is possible that all four L1 caches may have a miss requiring a block (line) access to the L2 cache, it is desirable for the L2 cache to have four independent, simultaneous ports similar to those in the L1 cache. However, this is difficult to achieve, requiring large, slow arrays. Thus, the L2 data array will have the pseudo-four-port (Banked) structure of FIGS. 8 and 9. Also, the remaining logical structure, including the off-chip interface, is analogous to that previously shown.

IV. Multi-Node System

Figure 11:
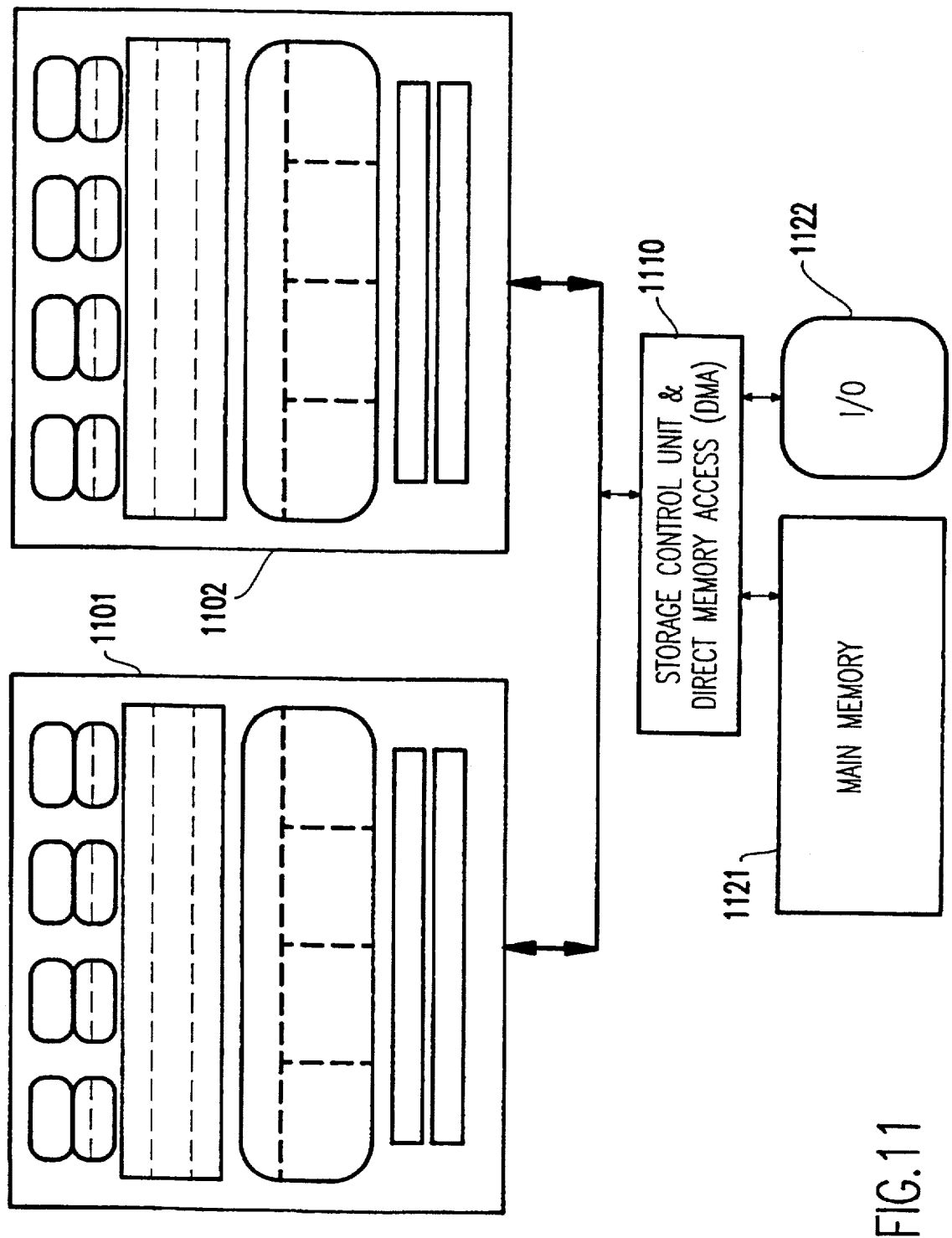
FIG. 11 is a block diagram of a multiprocessor system fabricated with a plurality of multiprocessor "node" chips.

The above three chip architectures each represents, in effect, a generic multiprocessor node chip which can be used in conjunction with other relatively standard chips to build a multiprocessor (MP) system (e.g., four-way MP as illustrated previously). Because of the generic nature of the node chip, it can also be used as a building block for a larger, multiprocessing system. For instance, an eight-way MP system can be built by simply connecting two such four-way MP node chips together as shown in FIG. 11. In FIG. 11, two four-way MP node chips 1101 and 1102 are connected to storage control unit and DMA 1110 which provides access to main memory 1121 and I/O ports 1122. Since the four-way MP node chips 1101 and 1102 are architected to work with standard memory controllers, a multi-node system can be fashioned with a somewhat more complex external interface, either custom or predesigned, which will provide the coordination between nodes, external memory, and I/O, as shown.

There are several ways to externally connect these two node chips. One is to consider each L2 cache on its chip as private for that node. In such a case, the coherency between the two chips would be maintained in the external connections, much the same as described above for a private on-chip L2 cache. Alternatively, the L2 caches on the two chips 1101 and 1102 can be considered as one global, shared cache sharing the same address space. Multiple node chips can be similarly connected together to yield a larger MP system with the number determined by cost and constraints of external connections.

V. Coherency Interconnect buses and Protocol

The on-chip coherency buses will be described specifically with respect to the private L1 cache organization, but can be applied to any level with a similar organization. Furthermore, the coherency protocol preferred is one which gives the private caches the appearance of a shared cache. Exclusive ownership of a line is not needed for writing, and modified lines can reside in, and be modified in multiple caches. This is referred to as shared modified coherency protocol and requires multiple, high-speed buses for implementation which are only feasible when the entire system is integrated on one chip.

Figure 12:
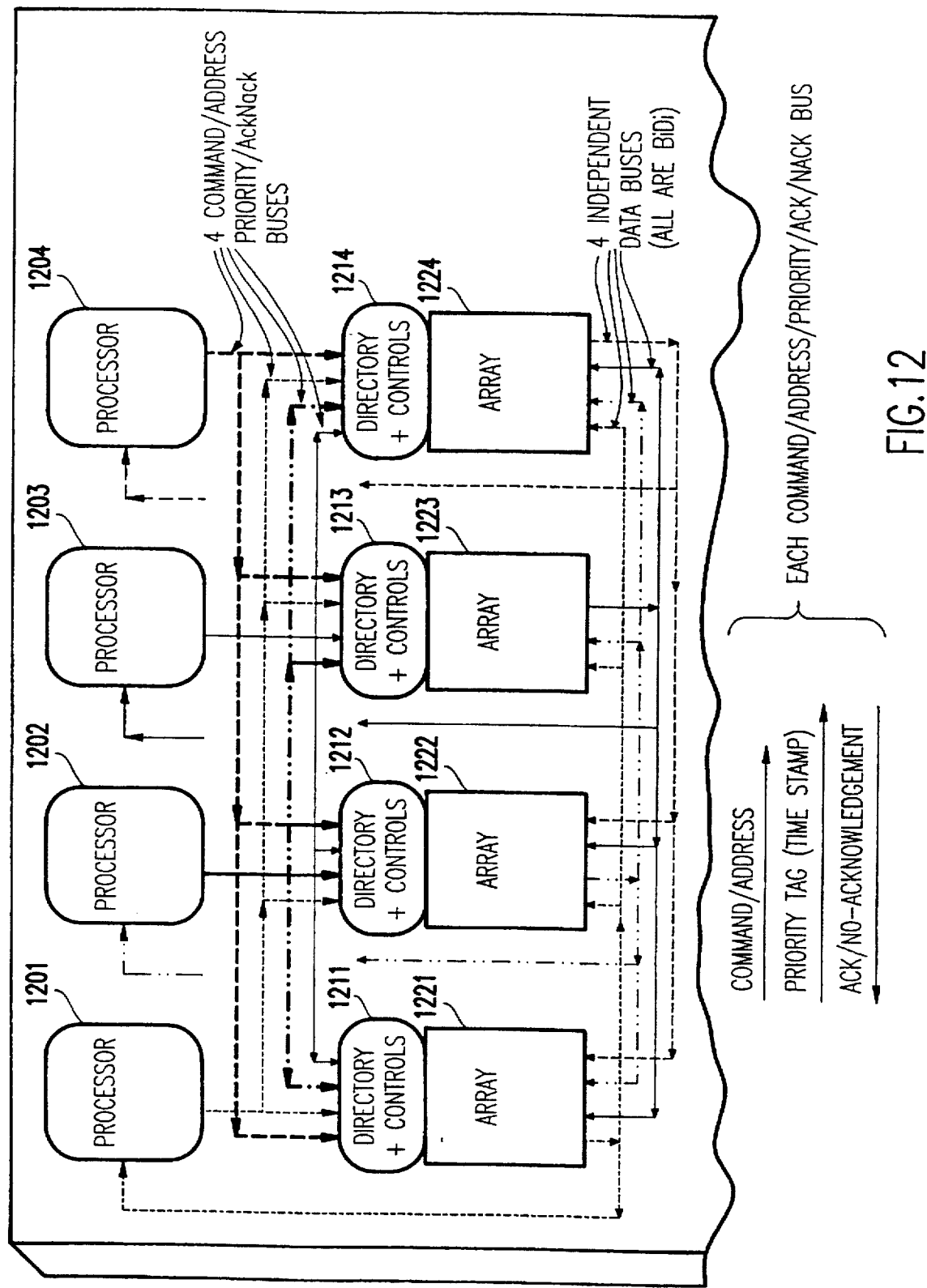
FIG. 12 is a block diagram of a coherency protocol bus using a four-ported directory and one-ported cache array.

To achieve this organization, each processor has a "coherency bus" which consists of three separate parts; command/ address lines, priority tag or time stamp line, and acknowledge/not-acknowledge lines. Each processor has one such coherency bus connecting all four cache directory/ control functions as shown in FIG. 12. Since such directory/ control is four-ported, each can accept and process four requests per cycle. However, the cache arrays 1221 to 1224 are one-ported as previously described. Whenever a processor 1201 to 1204 executes a cache access, the command (read, write, other), the address to be translated and a priority time stamp are to all directories 1211 to 1214. The local directory will know which input bus is local. All directories will simultaneously perform address translation and send and Ack/NoAck signal which will indicate one of several possible actions. If the request was a read to logical word (typically a DW) of shared line and if none of the remote caches performed a store into the same logical word, all will send Ack-clean signal. If one or more stored into a different logical word of the same block (line), an Ack-dirty signal will be sent. The original cache will mark this block as modified but otherwise perform the access. However, if one or more remote caches stored into the same logical word, then the new data will be put on the bus typically on the subsequent cycle if this remote cache array had been doing an access for its processor on the same cycle. If the buses, arrays, and logic are sufficiently fast, the remote cache could return the data to the first processor on the same cycle for cases when this remote array was not busy servicing its own processor. This would eliminate one cycle of reload time for such cases, which can be significant. In either case, the original cache will have to store this line and mark it as modified-shared in its directory.

If the cache request was a local write to a shared line, the local cache array can (will) be accessed for the congruence class, but the "late-write" action must wait for a full Acknowledge from all other caches. Some of the possible cases are the following:

1. One or more remote processors are writing to the same logical word. If such a situation is permitted and not an out-of-order error, then the system must provide time stamps which will allow only the correct data to be written in all cache arrays. All cache directory/controls will look at all the appropriate priority time stamp lines to determine this action.

2. None of the remote processors are writing, but some may have the same line. Each remote directory must look at the operation and return an Ack/Nack to each other cache which has some action. When an Ack signal is received, the local cache can then complete the late-write operation.

Note that this organization inherently allows either a standard MESI protocol wherein any processor must get exclusive ownership of the line before writing, or the above described shared-modified protocol in which exclusive ownership is not required, but only that other caches have taken appropriate action. The above Ack/NAck bus can be logical operated in any such fashion and allows a wide range of choices.

Since each processor has a separate coherency bus path into each directory, and the local directory controls have access to all these incoming requests, multiple requests can be handled at the directory level. Since it has been assumed that the arrays are 1-ported, multiple request for the array will have to be queued into a small request first-in, first-out (FIFO) buffer.

The data-busses connecting arrays to processors and arrays to arrays are separate from the coherency bus. These array data buses could consists of one dedicated bus for each local cache and one shared bus which interconnects all four arrays if desired. It is assumed that each cache has a cache reload buffer so that it can be receiving a reloading line simultaneously with a local access from processor to cache. This bus and buffer organization would allow the transfer of one cache block (line) from any one cache to any (or all) others while allowing processors to access local caches, except the one cache which is supplying the reloading line. This is assuming everything occurs on one cycle. If transferring of the cache line from one to another cache required multi cycles, then all caches could be active during the transfer cycles.

The above data-bus organization only permits one remote cache line reload at a time due to the single, shared, bidirectional bus. In come cases, multiple local misses with remote hits can occur which would benefit form multiple reload buses. In the extreme case, it is possible for the four caches to each incur a local miss, and have these four misses incur four remote hits, one in each of the other caches. For instance, caches 1221, 1222, 1223, and 1224 can each have a local miss and respectively have a remote hit in caches 1224, 1223, 1222, and 1221, respectively. With one shared bus, only one reload can take place at a time. It is possible to have four simultaneous reloads if four buses are used, as shown in FIG. 12. This latter four-bus configuration is the preferred embodiment, if the chip density can support it. If not, the former can still be used, with supporting logic to queue the requests.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. A single chip comprising:
   multiple, independent processors;
   each processor having a private L1 cache and associated translation/memory management logic to implement a set-associative, late-select cache, each L1 cache having a multi-ported cache directory for fast coherency maintenance via a fully shared Snoopy protocol;

the L1 cache directories being interconnected by a plurality of buses to allow simultaneous interrogation and updating and having a late-write capability for "same cycle" update;

outputs from all L1 caches being interconnected by a selector/cross-point-switch for transferring data between caches, each L1 cache having a pseudo-two-port structure with associated full-line width reload and store-back buffers, each cache input/output data width being equal to a full line and connected to an input/output bus of equal width for line transfer;

each processor having a private L2 cache with an interface to the private L1 cache of the processor; each L2 cache having translation/management logic to implement a set-associative, late-select organization with DRAM directories having a late-write capability, each L2 cache comprising a DRAM main array, and an SRAM buffer to interface to the L1 cache;

coherency between the L2s being maintained by a global directory, selectors and logic directing cross-interrogates to an appropriate L2 cache, each L2 cache having a pseudo-two-port structure with data buffers for reload and store-back and an interface to main memory, a wide data input/output bus with a width equal to a cache line for reload/store back operations; and logic and data circuits for interfacing to an external main memory management unit, said chip being capable of working alone as a single node system or coupled via an external controller to other identical or similar nodes.

2. A single chip comprising:

N independent processors;

each processor having a private L1 cache and associated translation/memory management logic to implement a set-associative, late-select cache, each L1 cache having a multi-ported cache directory for fast coherency maintenance via a fully shared Snoopy protocol;

the L1 cache directories being interconnected by a plurality of buses to allow simultaneous interrogation and updating and having a late-write capability for "same cycle" update;

outputs from all L1 caches being interconnected by a selector/cross-point-switch for transferring data between caches, each L1 cache having a pseudo-two-port structure with associated full-line width reload and store-back buffers, each cache input/output data width being equal to a full line and connected to an input/output bus of equal width for line transfer;

the N independent processors all sharing one on-chip L2 cache having a directory, with the L2 cache and directory both physically structured into N banks;

each bank of the L2 cache having translation/management logic to implement a set-associative, late-select organization, the L2 cache and directory having a late-write capability;

the L2 cache comprising a DRAM main array and a SRAM buffer to interface to the L1 cache;

coherency between the N L2 cache banks being maintained by a global directory with selectors and logic for directing cross-interrogates to the appropriate L2 bank;

a wide data input/output bus having a width equal to a cache line for reload/store back operations;

each bank of the L2 cache having an integrated address bus decoder-selector-priority function directly coupled to a data input/output selector-bus section; and logic and data circuits for interfacing to an external main memory management unit, such chip being capable of working alone as a single node system, or coupled via an external controlled to other identical or similar nodes.

3. The single chip of claim 2 wherein each bank of the shared L2 cache independently accesses only its portion of the total L2 array;

each bank having a separate bank priority selector, bank address selector and data input/output selector;

each bank priority selector receiving a separate bank address from each of the N independent processors and, from these, generating one of N possible enable signals;

each bank address selector receiving a remaining portion of the memory addresses from each of the N independent processors, each bank address selector receiving N enable inputs, all from its respective bank priority selector, each bank priority selector asserting one or none of the enable output signals as an input for its bank address selector which provides the address to the bank array; and each data input/output selector receiving N inputs, one from each array input/output port of the N banks, and N enable signals, one from each of the N bank priority selectors, the output of each data input/output selector serving as an input/output bus for only its respective processor.

4. The single chip of claim 2 wherein each bank of the shared L2 cache independently accesses only its portion of the total L2 array;

each bank having a separate bank priority selector, bank address selector and data input/output selector;

each bank priority selector receiving a separate bank address from each of the N independent processors and, from these, generating one of N possible enable signals;

each bank address selector receiving the remaining portion of the memory addresses from each of the N independent processors, each bank address selector receiving N enable inputs, all from its respective bank priority selector, each bank priority selector asserting one or none of the enable output signals as an input for its bank address selector which provides the address to the bank array;

each input/output selector having as data input only an input/output of its respective bank, there being N output ports, one for each of the N independent processors, a selection being determined by an assertion of one or none of the N enable inputs which all come from the same bank priority selector for each respective bank, the enable signal causing data from its respective array to be placed on one of N data output buses where each such bus is ORed to a corresponding bus of each of the other N-1 data input/output selectors, each one of the N data output buses serving one of the N independent processors.

5. A single chip comprising:

multiple, independent processors;

each processor sharing one large L1 cache and associated translation/memory management unit with logic to implement a set-associative, late-select cache, the L1 cache having a directory, and L1 cache array and directory being multiported with as many ports as there are processors on-chip, each port having an independent address and data buses, one for each processor to allow simultaneous access and updating of the L1 cache array and directory, with both having a late-write capability for "same cycle" update;

L1 cache input/output data width equal to a full line size and connected to an equal width bus for line transfer;

the multiple, independent processors all sharing one on-chip L2 cache having a directory, with the L2 cache and directory both physically structured into as many banks as there are processors on-chip;

each bank of the L2 cache having translation/management logic to implement a set-associative, late-select organization, the L2 cache and directory having a late-write capability;

each L2 cache comprising a DRAM main array and a SRAM buffer to interface to the L1 cache;

coherency between the L2 cache banks being maintained by a global directory with selectors and logic for directing cross-interrogates to the appropriate L2 bank;

a wide data input/output bus having a width equal to a cache line for reload/store back operations;

each bank of the L2 cache having an integrated address bus decoder-selector-priority function directly coupled to a data input/output selector-bus section; and logic and data circuits for interfacing to an external main memory management unit, such chip being capable of working alone as a single node system, or coupled via an external controlled to other identical or similar nodes.

6. A multiprocessor system comprising:

a plurality of node chips, each containing multiple processors and L1 and L2 caches on a single chip, wherein said L1 cache is a SRAM and said L2 cache is a DRAM; and an external controller chip connecting said plurality of node chips to form a larger multiprocessor system, an amount of multiprocessing being scalable by adding more or less node chips to said controller chip, wherein at least one of said plurality of node chips further includes:

in each of said multiple processors a private L1 cache and associated translation/memory management logic to implement a set-associative, late-select cache, each private L1 cache having a multi-ported cache directory for fast coherency maintenance via a fully shared Snoopy protocol;

the L1 cache directories being interconnected by a plurality of buses to allow simultaneous interrogation and updating and having a late-write capability for "same cycle" update;

outputs from all private L1 caches of said at least one of said plurality of node chips being interconnected by a selector/cross-point-switch for transferring data between caches, each private L1 cache having a pseudo-two-port structure with associated full-line width reload and store-back buffers, each cache input/output data width being equal to a full line and connected to an input/output bus of equal width for line transfer;

each processor having a private L2 cache with an interface to the private L1 cache of the processor, each private L2 cache having translation/management logic to implement a set-associative, late-select organization with DRAM directories having a late-write capability, each private L2 cache comprising a DRAM main array, and an SRAM buffer to interface to the private L1 cache;

coherency between the private L2s being maintained by a global directory, selectors and logic directing corss-interrogates to an appropriate private L2 cache, each private L2 cache having a pseudo-two-port structure with data buffers for reload and store-back and an interface to main memory, a wide data input/output bus with a width equal to a cache line for reload/store back operations; and logic and data circuits for interfacing to an external main memory management unit, said at least one of said plurality of chips being capable of working alone as a single node system or coupled via said external controller to other ones of said plurality of node chips.

7. The multiprocessor system recited in claim 6 wherein the L2 cache includes a SRAM array which acts as a high-speed front end buffer to the DRAM.

8. The multiprocessor system of claim 7 wherein said L1 and L2 caches are each composed of single, shared caches for the multiple processors on the chip.

9. The multiprocessor system of claim 7 wherein said L1 cache is composed of a plurality of private L1 caches, one for each of said multiple processors.

10. The multiprocessor system of claim 9 wherein said L2 cache is composed of a plurality of private L2 caches, one for each of said multiple processors, further comprising an on-chip global cross-interrogate directory for said private L2 caches.

11. The multiprocessor system of claim 9 wherein said L2 cache is composed of a single, shared L2 cache for the multiple processors on the chip.

* * * * *